United States Patent [19]

Marin

[11] 4,002,225
[45] Jan. 11, 1977

[54] RESURFACED BRAKE DISCS

[75] Inventor: Glenn R. Marin, Ransomville, N.Y.

[73] Assignee: The Carborundum Company, Niagara Falls, N.Y.

[22] Filed: Feb. 18, 1975

[21] Appl. No.: 550,328

Related U.S. Application Data

[62] Division of Ser. No. 374,742, June 28, 1973, Pat. No. 3,871,934.

[52] U.S. Cl. .............................. 188/73.2; 156/185; 156/213; 156/215; 156/305; 188/251 A; 192/107 M; 428/64

[51] Int. Cl.² ........................................ F16D 65/12

[58] Field of Search .......... 188/251 R, 251 A, 73.2, 188/218 A; 192/107 M; 156/94, 185, 213, 215, 227, 305; 428/64, 65, 66

[56] References Cited

UNITED STATES PATENTS

| | | | |
|---|---|---|---|
| 1,078,039 | 11/1913 | Fisher | 188/251 R |
| 2,149,324 | 3/1939 | Wales | 192/107 M |
| 3,122,221 | 2/1964 | Rucker | 188/70 R X |
| 3,692,150 | 9/1972 | Ruppe, Jr. | 188/73.2 |
| 3,712,427 | 1/1973 | Cook et al. | 188/251 A |
| 3,712,428 | 1/1973 | Marin | 188/251 A |

*Primary Examiner*—George E. A. Halvosa
*Attorney, Agent, or Firm*—David E. Dougherty; Raymond W. Green

[57] ABSTRACT

Resurfaced brake discs comprise a carbon disc and a wide tape of wear resistant material applied to the periphery of the disc, the tape being cut on one or both sides of the disc to allow the tape to be folded over the wearing surface of the disc. The tape is impregnated with a curable resin and heated under pressure to form a strongly adherent friction surface on the disc. Boron-containing or other additives may be added to the tape to improve friction qualities or to increase the oxidation resistance of the surface. Additional resin impregnations and heat treatments may be employed to strengthen the tape surface. The method is not limited to worn brake disc but may also be employed for resurfacing new brake discs as well.

5 Claims, 5 Drawing Figures

RESURFACED BRAKE DISCS

CROSS REFERENCE TO RELATED APPLICATION

The use of disc brakes in vehicles such as automobiles and airplanes has become increasingly common in recent years as the speed and power of these vehicles have been steadily increased. While drum type brakes are still suitable for many machine applications, the requirements for greater heat capacity and resistance to "fading" which are essential to brakes for high speed vehicles have, in many cases, exceeded the design capability possible with drum brakes, therefore making the disc brake essential. A light weight brake is also required for aircraft. While an aircraft may be used for only a short time during landing, the braking loads applied then may be severe calling for a disc brake of special design and using materials especially selected for heat and frictional resistance. Of these materials, reinforced carbon has been one of the best for friction elements, either in the form of brake pads rubbing against metal discs or as brake discs themselves made of carbon or graphite. The carbonaceous materials used in these high performance brake discs are expensive and may wear rapidly during service; since only part of the disc is actually worn, a relatively inexpensive method of replacing the friction surface is highly desirable.

It is an object of this invention therefore, to provide a method whereby carbonaceous friction discs can be provided with new friction surfaces, the method being applicable to either new or worn disc.

SUMMARY OF THE INVENTION

The invention provides a method for applying a friction surface to a carbonaceous brake disc, the disc having at least one periphery and at least one wearing surface. The method comprises of applying a tape of sufficient width to cover the periphery and at least one wearing surface of the disc. The tape overlap is then cut in at least one place on at least one side of the disc and the overlap folded and pressed against the surface of the disc, the tape being impregnated with a curable, carbonizable resin which is then cured and carbonized to form the friction surface. The tape is preferably long enough to circumvent the periphery of the disc by at least 5 or even 10 times, and may contain an additive, such as those comprising boron compounds, to protect the tape against oxidation or to improve friction qualities. This method can be applied to either new or worn discs, to reinforce wearing surfaces or to provide a relatively inexpensive method of replacing friction surfaces on discs which are composed of highly expensive materials and which would otherwise be discarded when worn, respectively.

DETAILED DESCRIPTION

Figure 3:
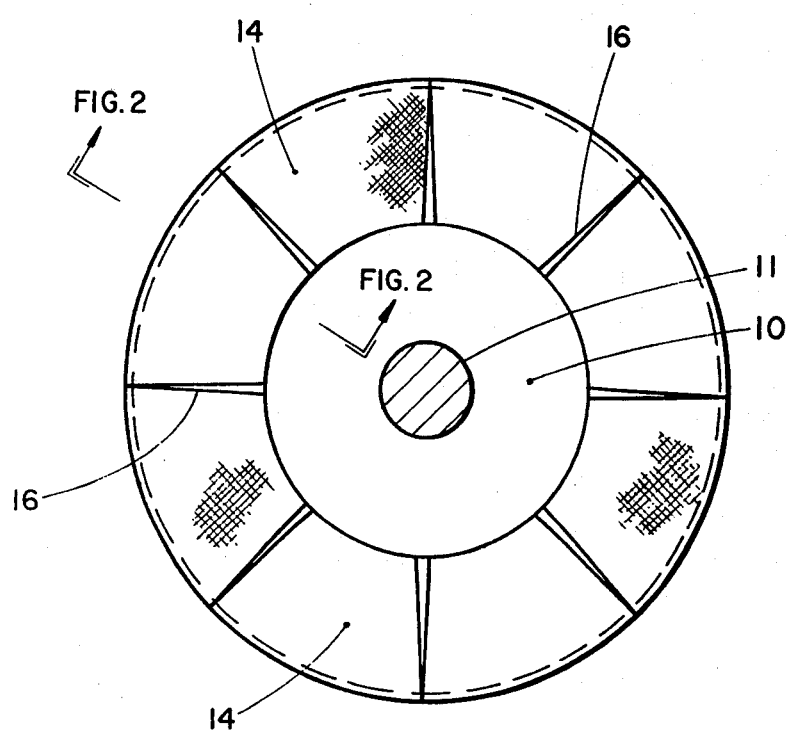
FIG. 3 is a side view of the disc, showing the new friction surface as applied to the outer periphery of the disc.

In disc brake construction, some discs are made of metal such as brass or steel, these materials giving a disc of high tensile strength and hardness. A disadvantage of these is the weight of the metal and the tendency of the disc to warp at high operating temperatures. Metals have relatively low heat capacity and the discs heat up rapidly during extended braking loads. Reinforced carbon or graphite is therefore a preferred disc material for some applications, having less weight and considerably greater heat capacity than the metals. For some applications, the desirable properties of both types of material may be combined by using a metallic disc which engages with friction surfaces of carbon or graphite.

After a carbonaceous disc brake assembly has been in operation for some time, the braking surfaces become worn and the braking efficiency decreases. Attempts made to apply new friction surfaces to the worn discs have usually been unsatisfactory, due to the difficulty of attaining a strong bond between the new material and the old surface. The present invention therefore provides a method whereby the new material is attached as a continuous unit, the material forming a continuous friction structure on the wearing surface of the disc and being firmly bonded thereto.

The new friction surface comprises a flexible strip or tape of a wear resistant material such as a refractory or ceramic in fibrous form. Materials of this sort may include carbides or nitrides of boron or silicon, silica or alumina, aluminum silicate, or refractory metals such as tungsten, molybdenum and the like. A preferred tape for this purpose is one of carbonaceous material such as carbon or graphite fibers. Whatever the material used, the tape must be flexible enough to permit forming against the brake disc surface and must be sufficiently permeable to allow the penetration of resinous material during impregnation.

The tape must be of sufficient length to circumvent the periphery of the brake disc at least once, but should preferably be long enough to circumvent the disc periphery as much as 5 to 10 times. Since dimensional tolerances are often important in brake disc assembly, it may be necessary to reduce the peripheral diameter of the brake disc sufficiently to compensate for the thickness of the tape which is added. In a similar way, the thickness of the worn surface of the disc may also require reduction to compensate for the added thickness of the tape surface. The tape should be wide enough to cover at least one wearing surface of the disc when the tape is folded over. This is shown in the end view of FIG. 1 where the brake disc 10, rotating on shaft 11, has the tape 12 wrapped around its outer periphery at 13. In this case, the disc has wearing surfaces on both sides and the tape 12 is wide enough to cover both of these surfaces when folded, as shown in end view FIG. 2, to form friction surfaces 14. While an untreated tape may be used, the method preferably uses a carbonaceous tape which has been treated with an additive such as finely divided ditungsten boride, either before or after wrapping on the disc. Other additive materials which can be used with the tape to enhance the oxidation resistance, frictional qualities or other properties include boron, niobium, silicon, tantalum, titanium, tungsten and zirconium; other borides of tungsten, and borides and niobium, silicon, silicon, tantalum, titanium and zirconium; carbides of boron, niobium, silicon, tantalum, titanium, tungsten and zirconium; and nitrides of aluminum, boron, niobium, silicon, tantalum, tungsten and zirconium. The additives are used as finely divided particles preferably having particle sizes of 250 microns or smaller and are held in place on the tape by a temporary binder. Binders such as phenolic condensation products, urea condensation products, epoxy resins, dextrose or coal tar pitch may be used; however a polymer of liquid furfuryl alcohol is preferred.

Figure 1:
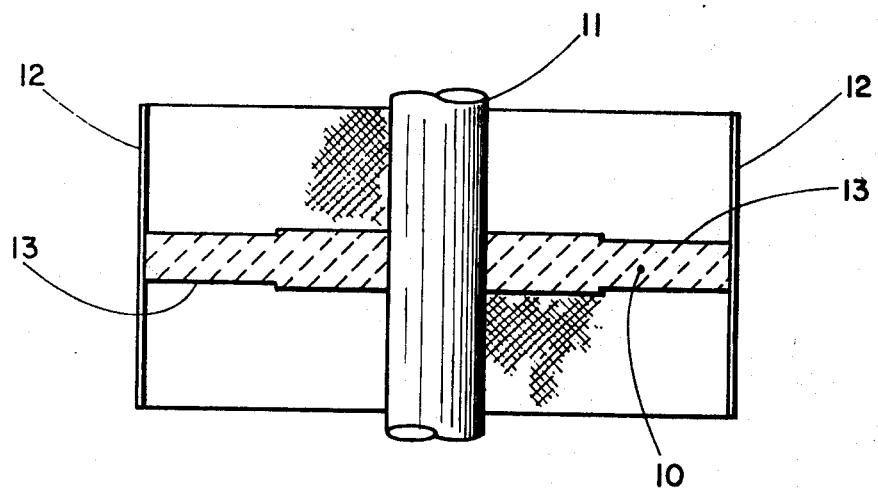
FIG. 1 is an end view of a disc, showing the placement of the tape around the periphery before tape folding.
Figure 2:
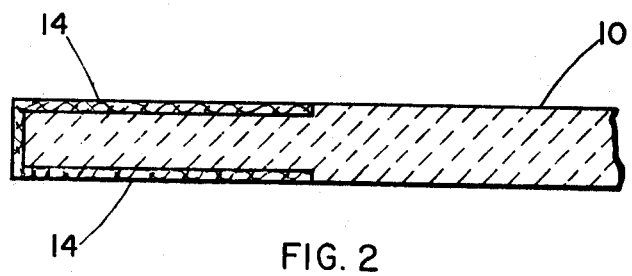
FIG. 2 is a partial end view of the disc, showing the tape folded and pressed in place to form the new friction surfaces.

The tape is then wound around the outer periphery of the disc, care being taken that it overlaps the disc equally on both sides, as shown in FIG. 1. The overlap is then cut, for example at 45° radial angle intervals around the periphery and folded over onto the surface of the disc, as shown in the side view in FIG. 3. A small amount of material may have to be trimmed off at each cut so that the friction surfaces formed do not overlap at the cut lines 16. The tape is then pressed against the surfaces of the disc and further impregnated with a suitable binder, such as those previously described. The impregnated tape is cured at about 150° C and under about 100 psi. pressure to give a friction surface as shown at 14 in FIGS. 2 and 3. If a carbonaceous tape is used, the carbonaceous surface is then further strengthened by baking it in a protective atmosphere of nitrogen, raising the temperature to about 800° C. During the baking cycle care must be exercised in raising the temperature of the surface so that the temperature is raised at a rate of about 5° C per hour until the article or surface is 450° C, then the rate of temperature increase is raised to about 20° C per hour until the article is at 800° C. At the completion of this baking cycle, the surface is cooled and impregnating and baking cycles may be repeated up to as much as six times, using an impregnant preferably consisting of equal parts of a liquid furfuryl alcohol prepolymer and furfural, catalyzed with about 3% by weight of maleic anhydride. At the completion of the third baking cycle the temperature of the surface may be raised to about 1650° C. The higher baking temperature, by reducing the volatiles remaining in the carbonaceous bond, strengthens the bond and improves the ability of the surface to absorb more resin during subsequent impregnation cycles.

Figure 4:
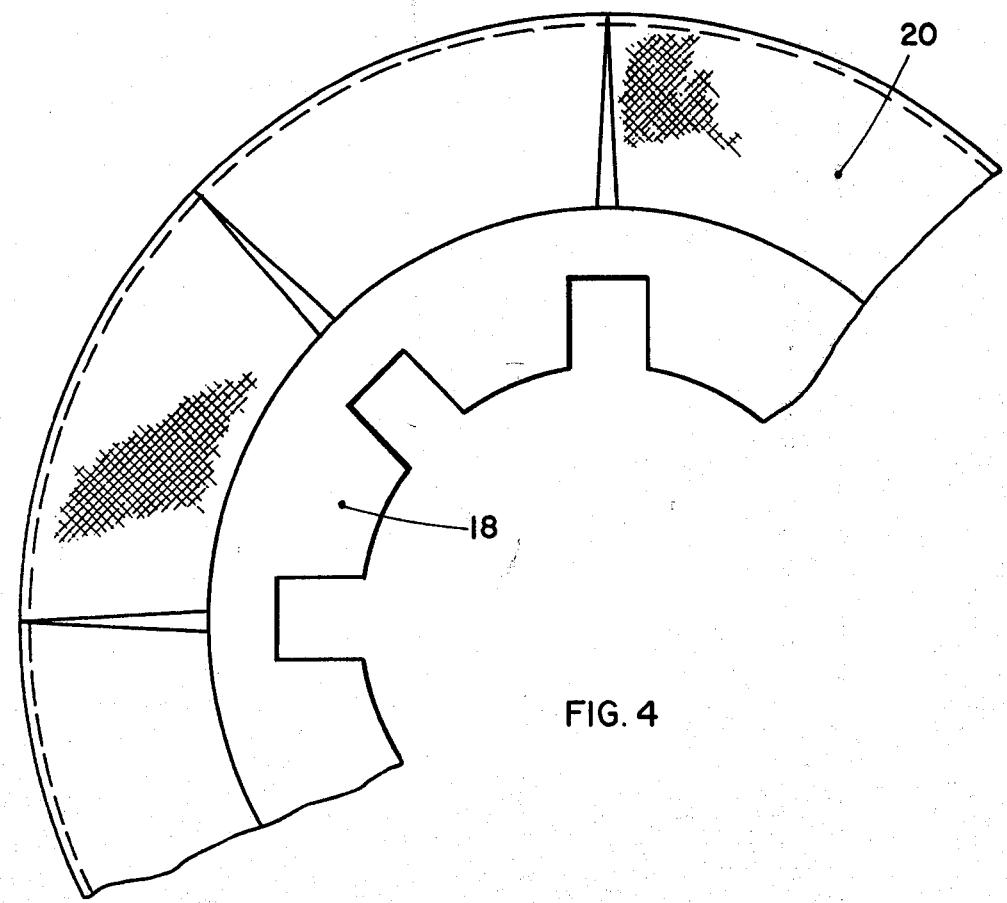
FIG. 4 is a partial side view of a disc, showing the new friction surface as applied to a disc with keyway slots in the inner periphery.
Figure 5:
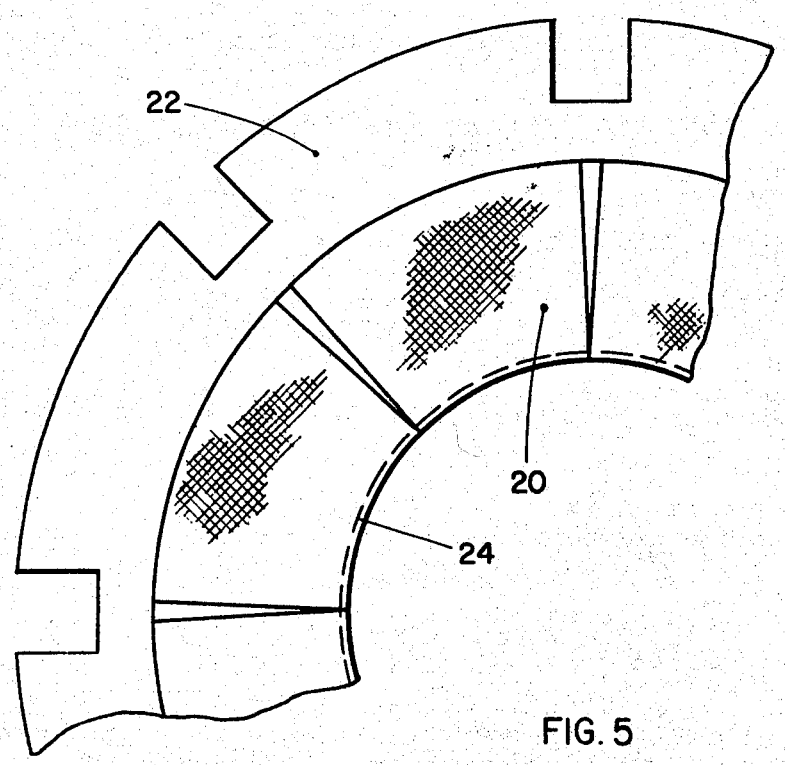
FIG. 5 is a partial side view of a disc, showing the new friction surface as applied to a disc with keyway slots in the outer periphery.

While the method of the invention has been described in terms of the application of new friction surfaces to a brake disk rigidly attached to a driving means, it is not restricted to this type of disc but may also be applied to those discs which contain peripheral driving recesses. Discs of this type are used in assemblies where the discs must be free to move in an axial direction and the rotary motions of the discs are controlled by the engagement of the peripheral slots. A disc of this type is shown in partial side view in FIG. 4. Here the disc 18 contains driving recesses upon the inner periphery. With this type of disc, the tape is applied to the outer periphery to form the new friction surface 20. Tape cutting, folding and impregnation steps are the same as those described previously. The method of the invention may also be applied to a disc 22 having keyways in its outer periphery, as shown in FIG. 5. The method is essentially the same, with a carbonaceous tape first being wound on a mandrel which is slightly smaller than the inside diameter of the disc opening 24. The wound cylinder of tape 20 is then inserted in the disc opening, the tape cut at 45° C intervals on both sides and then folded over both sides of the disc as previously described to give the friction surface 20. A partial side view of the completed disc is shown in FIG. 5.

While the discs shown in these drawings have the new friction surfaces applied to both sides, the method is not limited to this application but may also be employed for attaching a new friction surface to only one side of a disc, if desired. The method would then involve the application of a narrower tape to the disc periphery with a tape overlap on one side of the disc only. Cutting, folding, pressing and impregnation would be the same as previously described.

While the method of the invention is highly successful for resurfacing worn brake discs of carbonaceous material, it may also be employed for new brake discs as well when it is desired to provide a special reinforcement for the frictional wearing surfaces of the discs. Although the tape overlaps have been described as being cut at 45° radial angle intervals around the disc periphery, additional cuts may be made if desirable to give a better fit of the tape sections to the disc surface. The cuts may also be spaced to allow succeeding tape sections to overlap and cover the cuts made in the lower sections, thus minimizing the possibility of coating failure at the cut lines. Since the new friction material is applied as a continuous tape, which is then firmly bonded by additional resin impregnation and baking, the resulting friction surface is a strong one and as such displays a high resistance to the disintegrating effect of the frictional stresses generated during brake operation.

By using the method of the invention, a carbonaceous brake disc is provided, the disc having at least one periphery and at least one wearing surface. A flexible tape circumvents the periphery of the disc at least once, the tape overlapping and covering the wearing surface of the carbonaceous disc to form a friction surface thereon. The tape may be long enough to circumvent the disc 5 to 10 times, thus building up a friction surface increasing thickness and durability. The tape is a wear resistant material such as a refractory or ceramic in fibrous form, a preferable tape material being of carbon or graphite fibers. Before winding on the disc, the tape may be treated with suitable additives to enhance such properties as oxidation resistance and frictional qualities in the finished brake disc.

This type of construction increases the effectiveness of the disc friction surface and permits replacement of this surface when it becomes worn without affecting the structure of the underlying disc.

What is claimed is:

1. A carbonaceous brake disc, the disc having at least one periphery and including at least one flat surface, the brake disc comprising a flexible, permeable tape which circumvents the periphery of the disc at least once and overlaps and covers at least a portion of the flat surface of the disc to form a flat friction wearing surface thereon; the flexible, permeable tape being bonded to the flat surface by baked impregnated resin.

2. A carbonaceous disc according to claim 1 in which the tape comprises a carbonaceous material and is of sufficient length to circumvent the periphery of the disc at least 5 times.

3. A carbonaceous disc according to claim 2 in which the tape is of sufficient length to circumvent the periphery of the disc at least 10 times.

4. A carbonaceous disc according to claim 1 in which the tape contains a separately applied additive material.

5. A carbonaceous disc according to claim 1 in which the brake disc has two flat surfaces, and in which the tape overlaps and covers both flat surfaces.

* * * * *